United States Patent [19]

Ellsworth et al.

[11] Patent Number: 4,530,214

[45] Date of Patent: Jul. 23, 1985

[54] MANUFACTURE OF MOLDED FROZEN CONFECTIONS

[75] Inventors: Carroll V. Ellsworth, Hagerstown, Md.; Fredrick W. Schultz; Harold J. Vastag, both of Green Bay, Wis.

[73] Assignee: Gold Bond Ice Cream, Inc., Green Bay, Wis.

[21] Appl. No.: 597,240

[22] Filed: Apr. 4, 1984

[51] Int. Cl.³ .............................................. A23G 9/00
[52] U.S. Cl. ........................................... 62/71; 62/345
[58] Field of Search .................... 62/345, 71; 198/802, 198/706, 478, 646

[56] References Cited

U.S. PATENT DOCUMENTS

| | | | |
|---|---|---|---|
| 2,027,266 | 1/1936 | Bogaty | 198/802 X |
| 2,516,499 | 7/1950 | Albright | 198/802 X |
| 2,704,614 | 3/1955 | St. John et al. | 198/706 X |
| 3,145,829 | 8/1964 | Janouschek et al. | 198/706 |
| 3,463,298 | 8/1969 | Harrison | 198/802 X |
| 3,685,313 | 8/1972 | Rhodes | 62/345 |
| 4,171,042 | 10/1979 | Meissner | 198/706 X |
| 4,324,108 | 4/1982 | Billett et al. | 62/345 |

Primary Examiner—William E. Tapolcai
Attorney, Agent, or Firm—Andrus, Sceales, Starke & Sawall

[57] ABSTRACT

A confection freezing machine has a freezing chamber through which passes an endless conveyor having a plurality of successive separate planular support plates. The mold elements are supported on the support plates with one or more mold chambers normally facing upwardly. After the mold chambers are filled, the mold elements are carried through the freezing chamber to harden the ice cream therein. At the discharge from the freezing chamber, the mold elements are successively and automatically pivoted to an upsidedown inverted position for release of the confection therefrom. The mold elements are then pivoted back to their normal position for recharging.

13 Claims, 5 Drawing Figures

MANUFACTURE OF MOLDED FROZEN CONFECTIONS

BACKGROUND AND SUMMARY OF THE INVENTION

This invention relates to the manufacture of molded frozen confections.

Freezer machines are known which are adapted to receive previously formed or molded confections which are passed through a freezing chamber for a suitable time and then discharged for further processing such as packing and shipment. Such machines have usually had an endless conveyor associated therewith which enters and exits the freezing chamber. The conveyor has included a plurality of successive separate planular support plates arrayed in side-by-side relationship and mounted to a drive chain or the like. A single pre-formed unfrozen confection has been manually placed on each plate upstream of the entrance to the freezing chamber, passed therethrough for freezing and then discharged for manual pick-off from the respective plate, which serves solely as a confection-receiving support.

It is a task of the present invention to expand the function of the support plates so that they are utilized in direct association with the molding of confections to be frozen, as well as the freezing thereof. The result is expansion of the freezing machine's previously known capabilities to make it more cost effective.

In accordance with the various aspects of the invention, the support plates are provided with attachments comprising mold elements for being charged with soft ice cream or the like. The mold elements are supported on the support plates with one or more mold cavities normally facing upwardly. After the mold cavities are filled, the mold elements are carried through the freezing chamber to harden the ice cream therein. At the discharge from the freezing chamber, the mold elements are successively and automatically pivoted to an upside-down inverted position for release of the confection therefrom. The mold elements are then pivoted back to their normal position for recharging.

BRIEF DESCRIPTION OF THE DRAWINGS

The accompanying drawings illustrate the best mode presently contemplated by the inventors for carrying out the invention.

In the drawings.

DESCRIPTION OF THE PREFERRED EMBODIMENT

Figure 1:
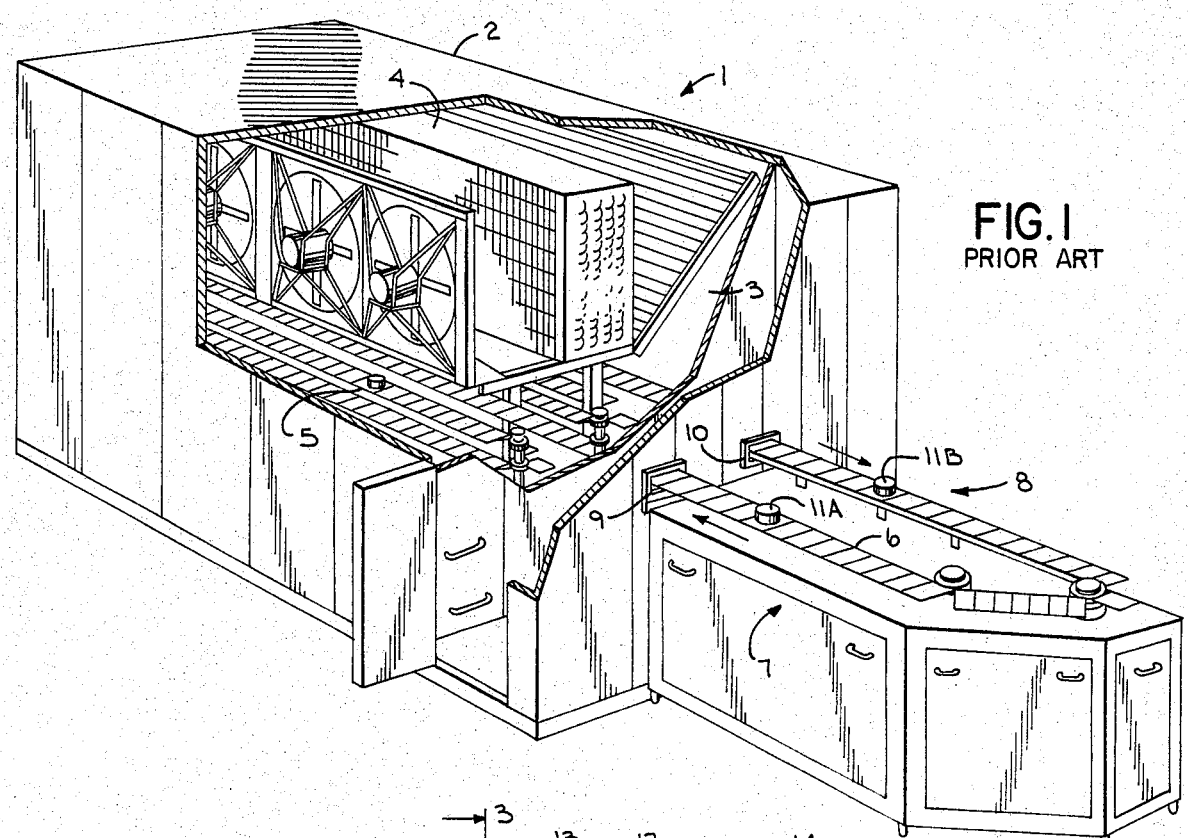
FIG. 1 is a schematic showing of a known confection freezing machine to which the concepts of the invention can be applied.

The known pre-formed confection freezing machine 1 shown in FIG. 1 comprises a housing 2 forming a freezing chamber 3 having any well-known equipment 4 therein for lowering the chamber temperature to, for example, −35° F. to −45° F. for quick freezing. An elongated conveyor 5 passes back and forth through freezing chamber 3 and generally comprises a plurality of reversing tiers on different vertical levels. The conveyor is chain driven via any suitable well-known sprocket drive, not shown in FIG. 1, and includes a plurality of generally rectangular separate planular confection support plates 6.

A confection feeding station 7 and confection discharge station 8 are shown as disposed external to one end of housing 2. Conveyor 5 passes along stations 7 and 8 and passes through entrance and exit openings 9 and 10 respectively in the housing wall in communication with freezing chamber 3. During operation of the known machine 1, pre-formed soft confections 11A have been manually placed on conveyor support plates 6 at feeding station 7, have passed through chamber 3 and then exited to discharge station 8 as hard frozen confections 11B for manual pick-off therefrom.

Figure 2:
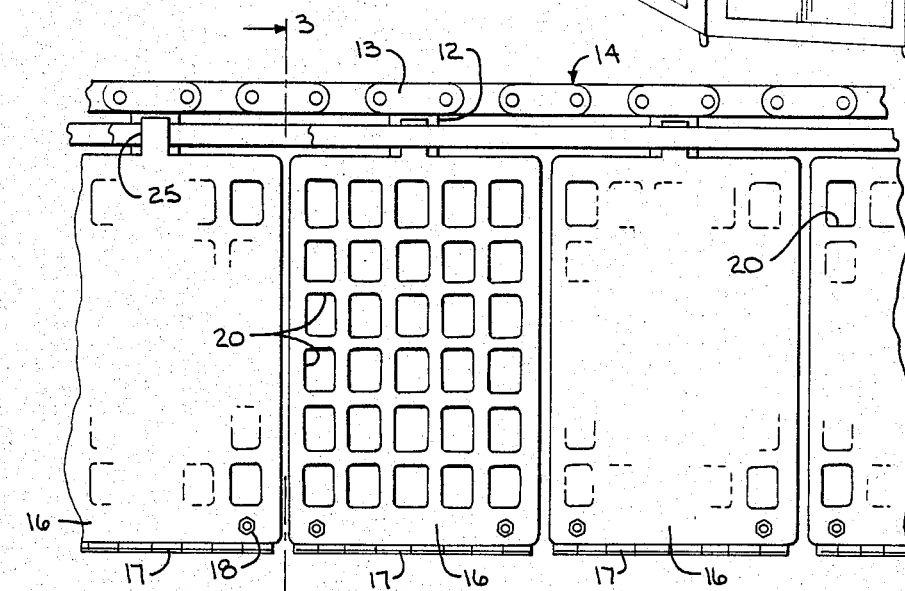
FIG. 2 is an enlarged fragmentary top plan view of a freezing machine conveyor incorporating the invention and showing the mold elements in normal position.
Figure 3:
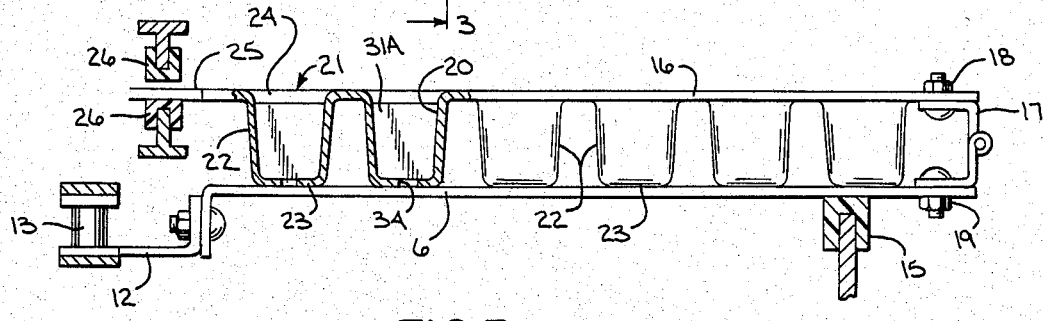
FIG. 3 is a transverse section taken on line 3—3 of FIG. 2 with parts broken away.

Referring now to FIGS. 2 and 3, the known support plates 6 are shown as connected at an inner end through a bolted-on arm 12 to a link 13 of the endless drive chain 14 of conveyor 5. The outer end portions of plates 6 remote from arms 12 and chain 14 are supported by a suitable track 15 which is coextensive with the path of conveyor 5 and keeps plates 6 generally horizontal.

In accordance with the various aspects of the invention, attachment means are provided for plates 6 so that confections may be molded and frozen during traversing of the plates between stations 7 and 8. For this purpose, mold elements 16 are removably and pivotally attached to the outer ends of plates 6, for example as by "piano" hinges 17 bolted thereto at 18 and 19 respectively. Mold elements 16 are shown as tray-like in form and in this embodiment have a plurality of mold cavities 20 therein for receipt of confections 21 in preliminary soft form, as will be described. Mold elements 16 are shown in FIGS. 2 and 3 in their normal position with the cavity walls 22 including bottom portions 23 functioning to support elements 16 directly on plates 6 with the cavity mouths 24 opening upwardly and spaced from plates 6. Each plate 6 and mold element 16 forms a folded assembly.

The inner ends of mold elements 16 are provided with lips 25 which are confined between a pair of cam tracks 26 for purposes to be described.

Figure 4:
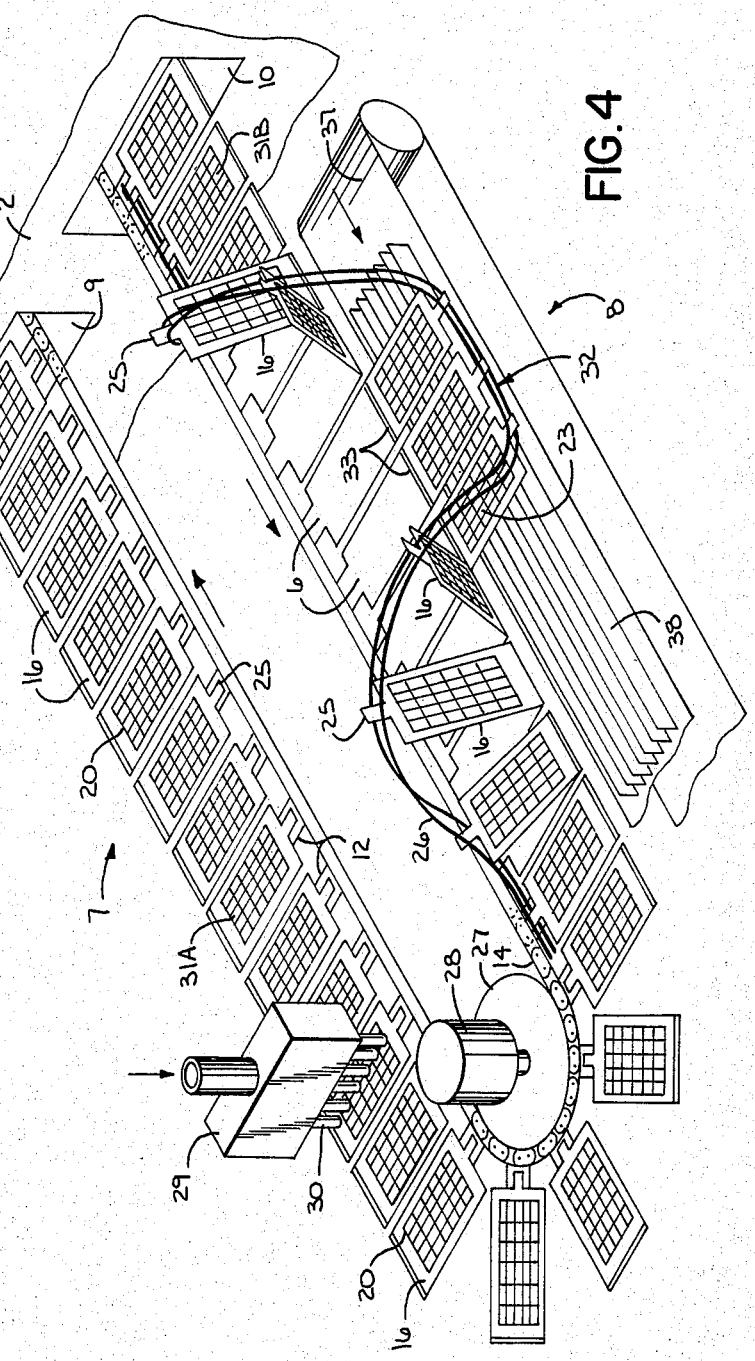
FIG. 4 is a schematic showing of the complete cycle contemplated in accordance with the invention.

FIG. 4 schematically illustrates the concepts of the invention as applied to machine 1. Drive chain 14 is shown as trained about a sprocket 27 disposed ajacent stations 7 and 8 and driven, as by a motor 28.

Feeding station 7 includes a mold cavity filler 29 having nozzles 30 through which a soft confection 31A such as ice cream is discharged into mold cavities 20. Conveyor 5 may be coordinated with filler 29 so that the conveyor moves in a stepped motion beneath the nozzles to fill one row of mold cavities 20 at a time in sequence. After cavities 20 are filled with confections 31A, the folded assemblies comprising support plates 6 and mold elements 16 pass through opening 9 into freezing chamber 3 wherein the confections are permanently molded into hard frozen nugget form 31B. The folded assemblies are then exited through opening 10 to discharge station 8.

Figure 5:
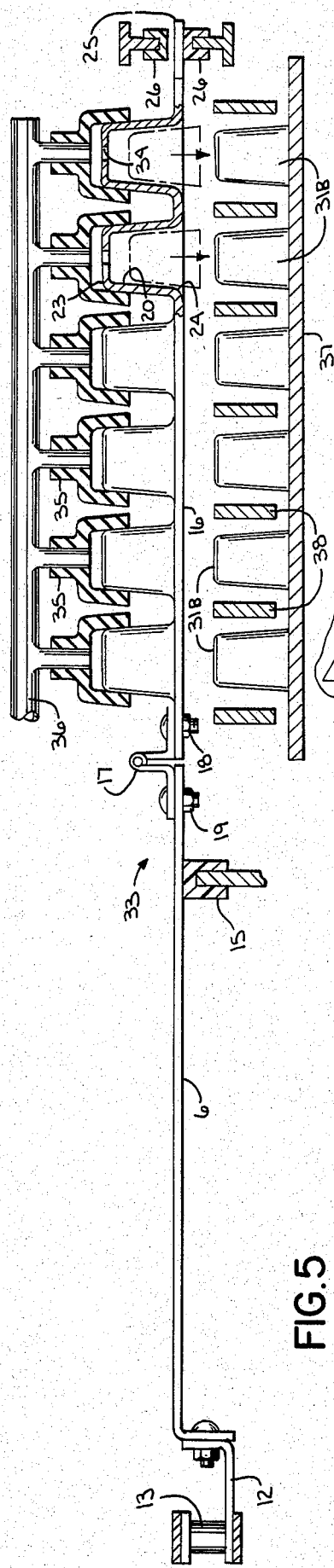
FIG. 5 is a view generally similar to FIG. 3 and showing the mold element in pivoted discharge position.

Cam tracks 26 may extend along and parallel to conveyor 5 from feeding station 7 and through chamber 3 and opening 10, although this is not shown. As the folded assemblies reach station 8, cam tracks 26 merge into a contoured generally U-shaped portion 32. As conveyor 5 continues moving, lips 25, which function as cam followers engaging the tracks, are caused to lift up and over to cause mold elements 16 to pivotally unfold automatically from their normal position and flip over to an upside-down inverted position, generally planular with plates 6, shown at 33 in FIG. 4 and in FIG. 5, wherein cavity mouths 24 open downwardly.

Means are provided to then discharge confections 31B from mold elements 16. For this purpose, and in the present embodiment, cavity wall bottoms 23 are provided with openings 34, and resilient cups 35 connected through tubes 36 to any suitable source of pressurized gas, not shown, are moved down into sealing engagement with the exterior of bottom walls 23. A blast of pressurized air passes from cups 35 and through openings 34 to push the inverted molded frozen confections 31B down and out of cavities 20 so that they ultimately fall by gravity onto a moving discharge endless belt conveyor 37 which may have a series of lane-forming separator plates 38 thereon. Conveyor 37 then carries confections 31B to a shipping or other desired station.

Subsequently, the emptied mold elements 16 are automatically refolded back in succession by cam tracks 26 to their normal position and are ready for refilling.

The concepts of the present invention provide a unique attachment to a usual confection freezing machine wherein both molding and hard freezing of confections are accomplished as part of the machine's operation. Mold elements 16 can easily be removed from support plates 6 to thereby convert machine 1 back to solely a confection freezing device if desired.

Various modes of carrying out the invention are contemplated as being within the scope of the following claims particularly pointing out and distinctly claiming the subject matter which is regarded as to the invention.

We claim:

1. In a confection freezing machine having a soft confection filling station, a freezing chamber and a hard frozen confection discharge station, and having a conveyor, said conveyor including a plurality of generally horizontal confection support plates disposed successively therealong, the improvement comprising:
   (a) mold elements pivotally attached to said support plates to form foldable assemblies and with said mold elements having confection molding cavities therein,
   (b) said mold elements having normal positions disposed above said plates when said assemblies are folded and wherein the mouths of said cavities face upwardly for filling with soft unmolded confection material at said filling station,
   (c) means for driving said conveyor and said assemblies with normally positioned filled mold elements from said filling station and through said chamber to said discharge station to thereby firmly mold and hard freeze said confection material in said mold cavities,
   (d) and means disposed adjacent said discharge station for pivotally unfolding said assemblies to invert said mold elements so that the latter are positioned with the mouths of said cavities facing downwardly for subsequent discharge of said molded and frozen confection material from said cavities.

2. The improvement of claim 1 which includes means for removing said molded and frozen confection material from the cavities of said unfolded assemblies.

3. The improvement of claim 1 in which said mold cavities have bottom walls which rest on said support plates when said assemblies are folded.

4. The improvement of claim 1 which includes means for refolding said unfolded assemblies into normal folded position after discharge of molded frozen confection material from said cavities.

5. The improvement of claim 4 wherein said unfolding and said refolding means includes means to unfold and refold said assemblies automatically in succession.

6. The improvement of claim 4 wherein said unfolding and refolding means comprises:
   (a) cam means disposed generally adjacent said discharge station,
   (b) and follower means disposed on said molded elements and engaging said cam means at said discharge station,
   (c) said cam means being contoured so that, as said conveyor is driven adjacent said discharge station, said follower means unfolds and then refolds said assemblies.

7. The improvement of claim 6 in which said cam means is generally U-shaped.

8. The improvement of claim 7 which includes means for removing said molded and frozen confection material from the cavities of said unfolded assemblies.

9. The improvement of claim 8 in which:
   (a) said mold cavities have bottom walls with openings therein,
   (b) and said confection removing means comprises resilient cups connected to a source of pressurized gas and sealingly engageable with the exterior of said bottom walls to force pressurized gas through said openings and push said confections downwardly out of said cavities.

10. The method of molding and freezing confection material in a confection freezing device having a filling station, a freezing chamber and a discharge station, and having a conveyor with a plurality of generally horizontal confection supporting plates, comprising the steps of:
    (a) providing mold elements pivotally attached to said support plates to form foldable assemblies and with said mold elements having confection molding cavities therein,
    (b) positioning said assemblies at said filling station in folded condition with the mouths of said cavities facing upwardly,
    (c) filling said cavities with soft unmolded confection material,
    (d) driving said conveyor through said freezing chamber to said discharge station to firmly mold and hard freeze said confection material in said filled cavities,
    (e) and pivotally unfolding said assemblies to invert said mold elements at said discharge station so that the mouths of said cavities face downwardly for subsequent discharge of said molded and frozen confection material from said cavities.

11. The method of claim 10 which includes the further step of removing said molded and frozen confection material from said unfolded assemblies.

12. The method of claim 11 which includes the further step of refolding said unfolded assemblies after said molded and frozen confection material has been removed from said assemblies.

13. A frozen confection formed in accordance with the method of claim 10.

* * * * *